Dec. 3, 1940.     D. M. SMITH     2,223,795
PISTON EXPANDER
Filed Jan. 6, 1940     2 Sheets-Sheet 1

INVENTOR:
DALLAS M. SMITH
BY J. Henry Kinealy,
ATTORNEY

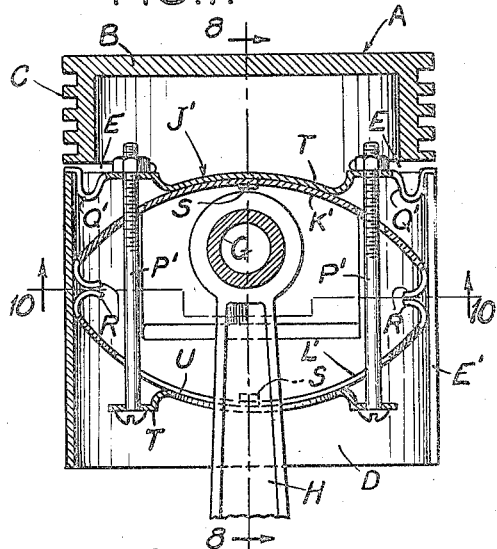
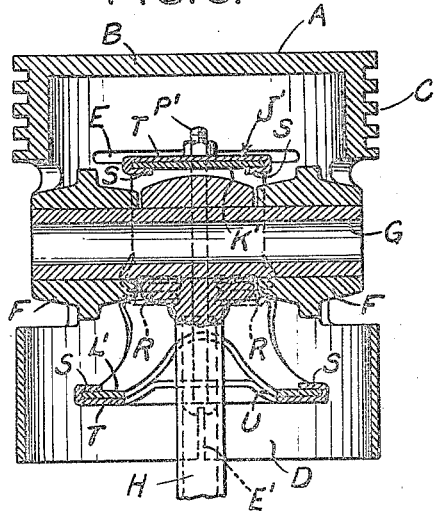
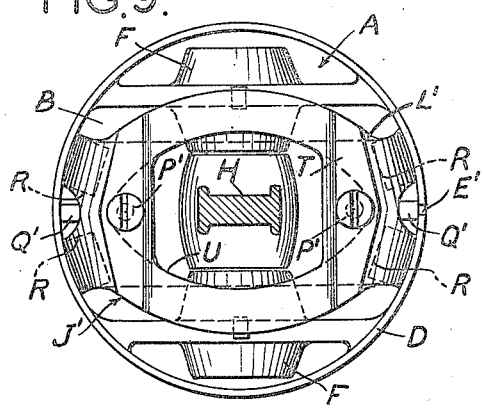
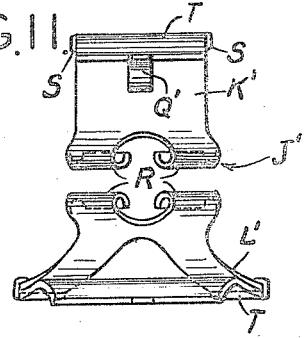
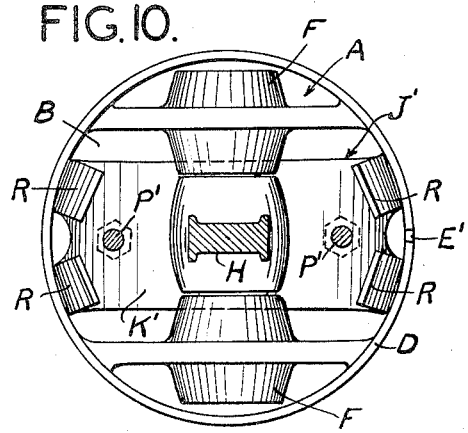

Patented Dec. 3, 1940

2,223,795

UNITED STATES PATENT OFFICE 2,223,795

PISTON EXPANDER

Dallas M. Smith, Kirkwood, Mo., assignor to McQuay-Norris Manufacturing Company, St. Louis, Mo., a corporation of Delaware Application January 6, 1940, Serial No. 312,746

10 Claims. (Cl. 309—12)

My invention relates to piston expanders and more particularly to piston expanders as used in the split-skirt pistons of internal combustion engines to increase the diameter of the piston skirt and to provide a better fit between the piston and the wall of the cylinder in which it reciprocates.

Heretofore, many such expanders have been made and used, but all have been subject to certain definite and serious deficiencies of structure. In the first place, many of the expanders did not expand the piston in the proper direction. That is to say, the diameter of the piston was increased mostly at the portions including the bosses whereas the piston should be expanded at points ninety degrees from the bosses. Secondly, many expanders heretofore used would not stay in place in the piston and after becoming dislodged in operation would fall into the crank case of the motor with harmful results to the working parts. In several instances expanders have been held in position by hanging them on the piston pin but often such devices would be loosened and would cut and seriously damage the pin. Thirdly, and most important, the expanders heretofore used were not adjustable in any way. That is, each different size piston required a different expander and for a given piston only a fixed expansive force could be exerted by the expander against the skirt. Often an expander of a given strength will not expand to the same degree the skirts of two pistons of the same size and type because of small variations in the stiffness and texture of the metal in the different pistons. Furthermore, sometimes it is beneficial to adjust and regulate the amount of expansion of a skirt and thereby fit it within a cylinder.

Having in mind these and other deficiencies of the structures heretofore used, the objects of my invention are to provide a piston expander which will expand in the proper direction the skirt of a piston in which it is used; to provide an expander which will remain in place in the piston and will not be subject to accidental dislodgment and can not drop into the other parts of the motor; to provide an expander which does not engage any operating part of the piston; and to provide an expander which will be adjustable and in which the outward expansive force exerted against the piston skirt may be regulated and controlled.

Figure 1:
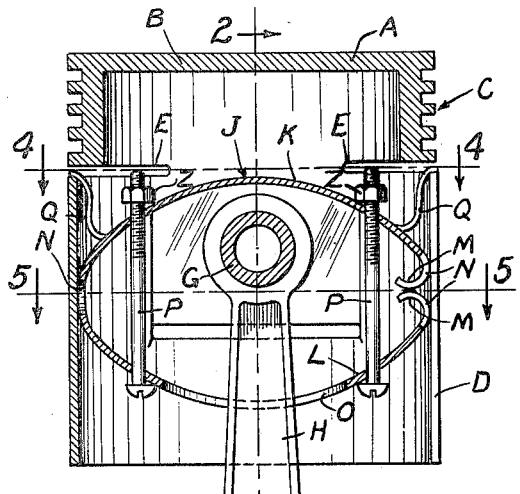
Figure 2:
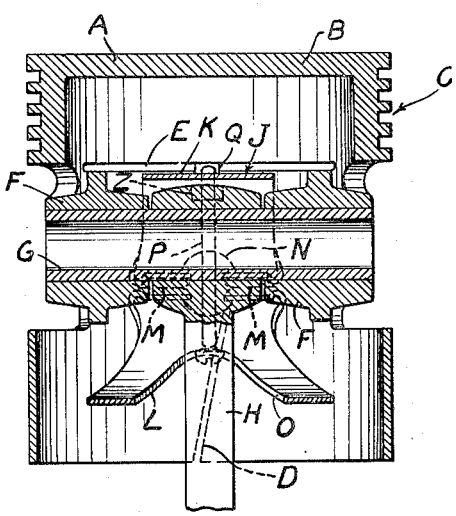
Figure 3:
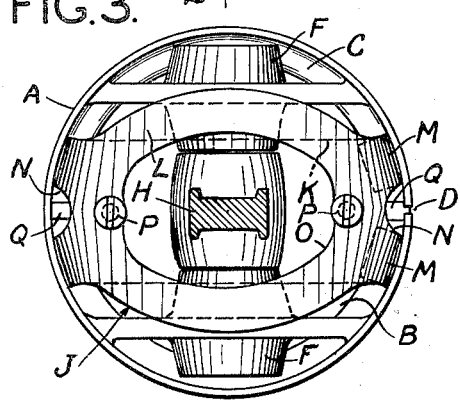
Figure 4:
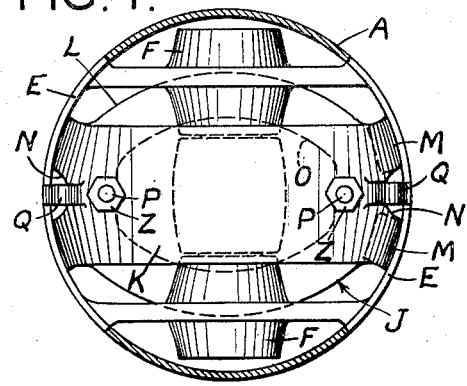
Figure 5:
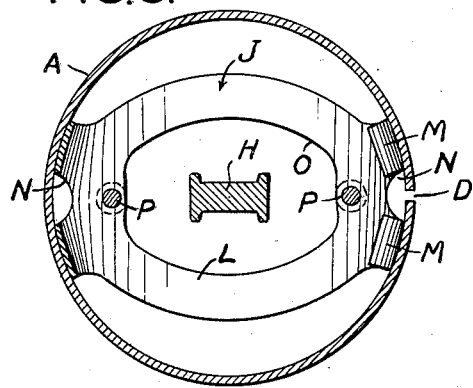
Figure 6:
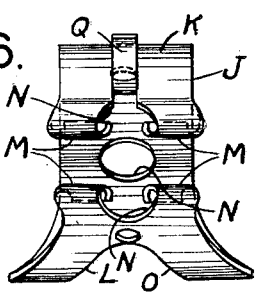

Although expanders embodying the broad concepts of my invention may be made in various forms, in the accompanying drawings wherein similar characters are used to designate similar parts, I have shown two embodiments only of my invention. In these drawings Fig. 1 is a cross section of my new and improved expander in place in a piston; Fig. 2 is a section of a piston along the lines 2—2 in Fig. 1; Fig. 3 is a bottom view of the piston with the expander inserted therein; Fig. 4 is a transverse section along the lines 4—4 in Fig. 1; Fig. 5 is a transverse section along the lines 5—5 in Fig. 1; Fig. 6 is an end view of an expander removed from the piston; Fig. 7 is a cross section of a piston including a different form of expander as embodying my invention; Fig. 8 is a section along the lines 8—8 in Fig. 7; Fig. 9 is a bottom view of the piston and expander; Fig. 10 is a view along the lines 10—10 in Fig. 7; and Fig. 11 is an end view of the expander in this form.

Referring to the figures and particularly to the embodiment of my device shown in Figures 1 to 6 inclusive, the piston A comprises a head B, including the ring belt C, and a split resilient skirt D depending from the head and separated therefrom throughout most of its periphery by circumferentially extending slots E. Carried by the head and the skirt are a pair of bosses F in which is mounted in the usual manner a pin G to carry the connecting rod H.

A piston skirt expander embodying my invention includes a pair of longitudinal members positioned within and extending diametrically of the piston and having ends arranged to engage the inner surface of the piston skirt. The longitudinal portions are bowed or otherwise formed relative to each other so that by moving the portions away from or towards each other the length of the expander and, in turn, the expansive force exerted thereby can be adjusted and controlled. In this embodiment the expander is indicated generally at J.

In the form shown in Figs. 1 to 6, inclusive, the expander is made from a single piece of spring metal of suitable type and thickness and has an upper longitudinal member K and a lower longitudinal member L, both extending generally diametrically across the skirt and arranged to contact the skirt at diametrically opposed points at about ninety degrees from the bosses F. Preferably, the ends of the expander in engagement with the skirt are arcuate in shape, as shown, and the free ends M are bent inwardly. In order to facilitate proper formation of the ends, I prefer that notches N be provided at each end of the expander. The longitudinal portion K is of less width than the lower portion L so that when the expander is inserted in the piston the portion K may be moved upwardly past the bosses F whereby when the connecting rod is mounted on the pin G inserted through the bosses the portion K will be above and the portion L will be below the connecting rod head. To allow movement of the connecting rod during operation of the motor the portion L is provided with an enlarged opening O therethrough.

The portions K and L, in this embodiment, are bowed away from one another and extending between the portions at points away from the center of the expander are bolts P. As these bolts are turned to bring the portions K and L towards one another the ends of the expander will be moved outwardly and a greater expansive force will be exerted against the skirt. Preferably, the head of each bolt is positioned downwardly so that adjustment of the expander may be made after it is in place in a piston and, in fact, after the piston is in the cylinder. The nuts Z may be soldered, welded or secured by any suitable expedient to the upper portion K.

Ordinarily, if the expander is adjusted to exert a proper expansive force against the skirt the expander will stay in adjusted position within the piston at all times. However, to avoid accidental movement of the expander during operation of the motor, spring wings Q may be provided with parts at their ends insertable in the slot E adjacent each end of the expander. The wings Q may be attached to the expander or may be formed by stamping out a narrow strip from the portion K as in the embodiment here shown and described.

The use of this embodiment of my invention is as follows:

The expander J, with the bolts P loosened so that the portions K and L are not under tension, is inserted in the piston removed from the cylinder and the expander is moved until the upper portion K is above the bosses. As the expander is moved upwardly the ends of the wings Q will slide along the inner surface of the skirt and when the expander is in proper position these ends will snap into the slots E and will be held in place by the inherent spring of the wings. The connecting rod H is then mounted on the pin G and the piston is put in the cylinder. The bolts P are then turned to put tension upon the portions K and L and to bring these portions closer to one another. As explained above, this action increases the length of the expander and causes the ends thereof to exert a firm outward expansive force against the piston skirt and to expand the skirt in a direction substantially ninety degrees from the axis of the pin bosses F. The bolts P are adjusted until the skirt is expanded to a point where it has the proper fit within the cylinder.

It should be noted that in this structure the portions K and L are maintained under constant tension by the bolts and flutter and vibration of these portions is prevented. Similarly, if for any reason the expander becomes dislodged from proper position within the skirt the upper portion K will ride on the head of the connecting rod and prevent the expander from dropping into the crank case. I have found that by adjustment of the bolts P the skirt of the piston may be expanded to any required degree to assure proper fit within the cylinder and satisfactory operation of the motor. Of course, the number and arrangement of the bolts P and the shape of the portions K and L may be varied to meet different requirements.

Now referring to the embodiment shown in Figs. 7 to 11, inclusive, the expander J' as shown therein has the longitudinal portions K' and L' thereof formed of separate pieces of metal, each having its ends turned inwardly, as indicated at R. The portions K' and L' are engaged by parts S and T, respectively, which with the bolts P' form a cage within which these portions are positioned. Preferably, the parts S and T are of heavier metal than the portions K' and L'. Also, the ends of the part S may be formed as shown in Fig. 7 to provide spring wings Q' having portions arranged to engage in the slot E of the piston. Of course, the part T has an opening U therein similar to the enlarged opening O' in the portion L' to allow movement of the connecting rod H.

While during operation the parts of the cage and the parts of the expander will remain in predetermined relative position, tabs V may be formed on the part S to engage the edges and marginal surfaces of the portion K' and similar tabs V' may be formed to engage the edges and marginal surfaces of the portion L'.

In this embodiment, the bolts P' engage the parts S and T and have no direct connection with the portions K' and L'. Preferably, enlarged holes W are provided in the portion K' to allow free passage of the bolts therethrough.

The use of this embodiment of my invention is very similar to the use of the invention described first above. The expander in a free state, that is, with the bolts turned to exert very little pressure on the parts S and T and, in turn, on the portions K' and L' is inserted in the piston. The wings Q' formed on the part S will ride the inner surface of the skirt until the expander is in proper position and then the ends thereof will snap into the slots E. When the expander is so positioned the bolts P' are turned to move the parts S and T towards one another and this movement will move the portions K' and L' towards one another to increase the length of the expander and to exert an outward expansive force against the piston skirt.

Although in the embodiment shown in Figs. 1 to 6, inclusive, flutter of the expander during operation will be obviated to a great extent, I have found that the use of the cage including the parts S and T will damp out any flutter or vibration in the expander even in the most extreme cases.

From the above, it will be obvious that an expander embodying my invention in either of the forms shown or in any other form as included in the ambit of the appended claims will be highly satisfactory in operation. The outward expansive force created by the expander may be regulated, adjusted and controlled to an exact degree and each piston may be fitted properly within the cylinder in which it reciprocates. Also, the expander will be held firmly in place in the piston and yet will not be engaged with any of the operating parts thereof.

It should be understood, of course, that I do not limit myself to the embodiments shown because many different expanders of various shapes, sizes and arrangements of the parts may be made to include the broad concept of my invention.

What I claim as new and desire to secure by Letters Patent, is:

1. A piston expander comprising a pair of longitudinal portions bowed relative to one another and having the ends thereof arranged to engage the inner surface of the skirt of a piston, means for causing said portions to move away from or towards one another whereby the length of said expander and the expansive force exerted by the ends thereof when placed in a piston may be adjusted, and spring parts carried by said expander and extending therefrom and adapted to engage circumferentially extending slots in said piston.

2. A piston expander comprising a pair of longitudinal portions bowed outwardly away from one another and bolts extending between said longitudinal portions at each end thereof whereby adjustment of said bolts will cause said longitudinal portions to move towards one another to increase the length of said expander whereby the expansive force exerted thereby when placed in a piston may be adjusted.

3. A piston expander comprising a pair of longitudinal portions adapted and arranged whereby said expander may be inserted in a piston with one of said portions extending diametrically across said piston above the connecting rod head and the other of said portions extending diametrically across said piston below the connecting rod head, said lowermost portion having an enlarged opening therein to allow free movement of said connecting rod, said portions being bowed relative to one another and means for causing said portions to move away from or towards one another whereby the length of said expander and the expansive force exerted thereby when placed in a piston may be adjusted.

4. A piston expander comprising a pair of longitudinal portions adapted and arranged whereby said expander may be inserted in a piston with one of said portions extending diametrically across said piston above the connecting rod head and the other of said portions extending diametrically across said piston below the connecting rod head, said lowermost portion having an enlarged opening therein to allow free movement of said connecting rod, and bolts connecting said portions whereby adjustment of said bolts will cause said portions to be moved towards one another whereby the length of said expander and the expansive force exerted thereby when placed in a piston may be adjusted.

5. A piston expander comprising a pair of longitudinal portions adapted and arranged whereby said expander may be inserted in a piston with one of said portions extending diametrically across said piston above the connecting rod head and the other of said portions extending diametrically across said piston below the connecting rod head, said lowermost portion having an enlarged opening therein to allow free movement of said connecting rod, bolts connecting said portions whereby adjustment of said bolts will cause said portions to be moved towards one another whereby the length of said expander and the expansive force exerted thereby when placed in a piston may be adjusted, and spring parts carried by said expander and extending therefrom and adapted to enter the circumferentially extending slots in said piston at substantially diametrically opposed points.

6. A piston expander comprising a pair of longitudinal portions bowed relative to one another, a pair of parts engaging said longitudinal portions and means for moving said parts and, in turn, said longitudinal portions away from or towards one another whereby the length of said expander and the expansive force exerted thereby when placed in a piston may be adjusted.

7. A piston expander comprising a pair of longitudinal portions bowed relative to one another, a pair of parts of heavier material than said longitudinal portions engaging said longitudinal portions and means for moving said parts and, in turn, said longitudinal portions away from or towards one another whereby the length of said expander and the expansive force exerted thereby when placed in a piston may be adjusted.

8. A piston expander comprising a pair of longitudinal portions bowed outwardly away from one another, a pair of parts engaging the outer surface of said longitudinal portions, and means for moving said parts and, in turn, said longitudinal portions towards one another whereby the length of said expander and the expansive force exerted thereby when placed in a piston may be adjusted.

9. A piston expander comprising a pair of longitudinal portions bowed outwardly away from one another, a pair of parts engaging the outer surface of said longitudinal portions, and bolts extending between said parts whereby adjustment of said bolts will move said parts and, in turn, said longitudinal portions towards one another whereby the length of said expander and the expansive force exerted thereby when placed in a piston may be adjusted.

10. A piston expander comprising a pair of longitudinal portions bowed outwardly away from one another, a pair of parts engaging the outer surface of said longitudinal portions, bolts extending between said parts whereby adjustment of said bolts will move said parts and, in turn, said longitudinal portions towards one another whereby the length of said expander and the expansive force exerted thereby when placed in a piston may be adjusted, and spring wings extending from one of said parts and adapted to enter the circumferentially extending slots in said piston at substantially diametrically opposed points.

DALLAS M. SMITH.